(12) United States Patent
Yamasaki et al.

(10) Patent No.: US 8,957,556 B2
(45) Date of Patent: Feb. 17, 2015

(54) DRIVE DEVICE

(75) Inventors: Masashi Yamasaki, Obu (JP); Hiroshi Imai, Toyohashi (JP)

(73) Assignees: Denso Corporation, Kariya (JP); Asmo Co., Ltd., Kosai (JP)

( * ) Notice: Subject to any disclaimer, the term of this patent is extended or adjusted under 35 U.S.C. 154(b) by 572 days.

(21) Appl. No.: 13/331,131

(22) Filed: Dec. 20, 2011

(65) Prior Publication Data

US 2012/0161558 A1   Jun. 28, 2012

(30) Foreign Application Priority Data

Dec. 28, 2010   (JP) ................. 2010-292291

(51) Int. Cl.
*H02K 11/00* (2006.01)
*H02K 9/22* (2006.01)
*H02K 5/22* (2006.01)

(52) U.S. Cl.
CPC ............ *H02K 11/0073* (2013.01); *H02K 5/225* (2013.01)
USPC ............. 310/68 D; 310/71; 310/68 R; 310/89

(58) Field of Classification Search
CPC ........... H02K 5/225; H02K 5/22; H02K 9/22; H02K 11/0073
USPC ............................. 310/64, 71, 68 R, 68 D, 89
See application file for complete search history.

(56) References Cited

U.S. PATENT DOCUMENTS

| | | | |
|---|---|---|---|
| 5,889,378 A | | 3/1999 | Hayashi |
| 5,932,942 A | * | 8/1999 | Patyk et al. ................ 310/58 |
| 6,081,056 A | | 6/2000 | Takagi et al. |
| 6,429,553 B1 | | 8/2002 | Taniguchi et al. |
| 6,577,030 B2 | | 6/2003 | Tominaga et al. |
| 6,704,201 B2 | * | 3/2004 | Kasuga ................... 361/704 |
| 7,042,122 B1 | | 5/2006 | Dufala et al. |
| 7,095,146 B2 | * | 8/2006 | Fukazawa et al. .......... 310/89 |
| 7,436,138 B2 | | 10/2008 | Beifus |
| 7,989,997 B2 | * | 8/2011 | Hashimoto et al. ....... 310/68 D |
| 2002/0117908 A1 | | 8/2002 | Sanchez et al. |
| 2002/0117914 A1 | | 8/2002 | Doi et al. |
| 2002/0118010 A1 | | 8/2002 | Pointer |
| 2003/0047304 A1 | | 3/2003 | Kasuga |

(Continued)

FOREIGN PATENT DOCUMENTS

| | | |
|---|---|---|
| CN | 1067495 | 12/1992 |
| DE | 19723664 | 12/1997 |

(Continued)

OTHER PUBLICATIONS

Office action dated May 30, 2014 in corresponding German Application No. 10 2011 056365.2.

(Continued)

*Primary Examiner* — Terrance Kenerly

(74) *Attorney, Agent, or Firm* — Harness, Dickey & Pierce, PLC

(57) ABSTRACT

A drive device includes a motor, a control unit and a holder. The motor has a motor case, a stator, a winding wire, a rotor and a shaft. The control unit includes a semiconductor module, a receiving member, and a cover. The control unit is arranged on a side of the motor in an axis direction of the motor. The holder is arranged between the motor and the control unit, and has a wall portion extending toward the control unit and fitting with the control unit.

18 Claims, 16 Drawing Sheets

(56) References Cited

U.S. PATENT DOCUMENTS

| | | |
|---|---|---|
| 2003/0127921 A1 | 7/2003 | Akutsu et al. |
| 2004/0104628 A1 | 6/2004 | Streng et al. |
| 2005/0029879 A1 | 2/2005 | Endo et al. |
| 2006/0006094 A1* | 1/2006 | Hofmann et al. ............. 206/706 |
| 2006/0267431 A1 | 11/2006 | Johnson et al. |
| 2007/0145836 A1* | 6/2007 | Bostwick ........................ 310/64 |
| 2009/0127945 A1 | 5/2009 | Hino et al. |
| 2010/0181853 A1 | 7/2010 | Wong et al. |
| 2011/0254393 A1 | 10/2011 | Yamasaki et al. |

FOREIGN PATENT DOCUMENTS

| | | |
|---|---|---|
| DE | 29 904361 | 5/1999 |
| DE | 69707226 | 7/2002 |
| DE | 102 45971 | 4/2004 |
| JP | 10-126999 | 5/1998 |
| JP | 2000-217310 | 8/2000 |
| JP | 2002-252958 | 9/2002 |
| JP | 2002-267491 | 9/2002 |
| JP | 2003-204654 A | 7/2003 |
| JP | 2006-187149 | 7/2006 |
| JP | 2008-072776 | 3/2008 |
| JP | 2008-245385 | 10/2008 |
| JP | 2009-011078 | 1/2009 |
| WO | WO 2007/142299 | 12/2007 |

OTHER PUBLICATIONS

Office action dated Jun. 5, 2014 in corresponding Japanese Application No. 2011-074880.
Office action Jun. 5, 2014 in corresponding Japanese Application No. 2010-292291.
U.S. Appl. No. 13/331,072, filed Dec. 20, 2011, Yamasaki et al.
Office action dated Jun. 6, 2014 in corresponding German Application No. 10 2011 056364.4.
Office Action dated Jul. 21, 2014 issued in the corresponding CN application No. 201110441757.0 with English translation.
Office Action dated Aug. 11, 2014 issued in the corresponding CN application No. 201110441868.1 (English translation).
Office action dated Dec. 30, 2013 in corresponding Chinese Application No. 201110441757.0.
Office action dated Jan. 6, 2014 in corresponding Chinese Application No. 201110441868.1.
Office action dated Mar. 25, 2014 in corresponding U.S. Appl. No. 13/331,072.

* cited by examiner

US 8,957,556 B2

DRIVE DEVICE

CROSS REFERENCE TO RELATED APPLICATION

This application is based on Japanese Patent Application No. 2010-292291 filed on Dec. 28, 2010, the disclosure of which is incorporated herein by reference in its entirety.

BACKGROUND OF THE INVENTION

1. Field of the Invention

The present invention relates to a drive device.

2. Description of Related Art

A three-phase motor is known, and is driven to rotate when three-phase AC current is supplied from a power source. In a case where the power source is a DC power source having a predetermined voltage, a controller is necessary for switching a winding current, so as to supply the winding current having different phases to winding wire having plural (e.g., three) phases, respectively.

JP-A-2003-204654 (US2003/0127921) describes a control circuit unit that is arranged parallel with a shaft of a motor and that is connected to a housing located on an output side of the motor.

However, when the control circuit unit is arranged parallel with the shaft of the motor, a size of the whole device becomes large in a radial direction. In a case where the motor and the control circuit unit are integrally connected to each other so as to make the size of the whole device smaller, if there is a clearance between the motor and the control circuit unit, a foreign matter may enter the device through the clearance.

SUMMARY OF THE INVENTION

The present invention is made in view of the above matters, and it is an object of the present invention to provide a drive device that can reduce the foreign matter entering the device between a motor and a control unit.

According to an example of the present invention, a drive device includes a motor, a control unit, and a holder. The motor has a motor case having a cylindrical shape; a stator arranged in the motor case in a radial direction; a winding wire wound around the stator so as to define plural phases; a rotor arranged in the stator in the radial direction and being rotatable relative to the stator; and a shaft rotated with the rotor. The control unit has a semiconductor module having a switching element which switches electricity supply to the winding wire; a receiving member that receives the semiconductor module; and a cover which accommodates the semiconductor module and the receiving member in the radial direction. The control unit is arranged on a side of the motor in an axis direction. The holder is arranged between the motor and the control unit, and has a wall portion extending toward the control unit and fitting with the control unit.

Accordingly, a foreign matter is restricted from entering the device.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENT

First Embodiment

A drive device 1 according to a first embodiment will be described with reference to FIGS. 1-14. The drive device 1 is applied to an electric power-steering apparatus (hereinafter referred as EPS), and has a motor 2 and a control unit 3.

Figure 1:
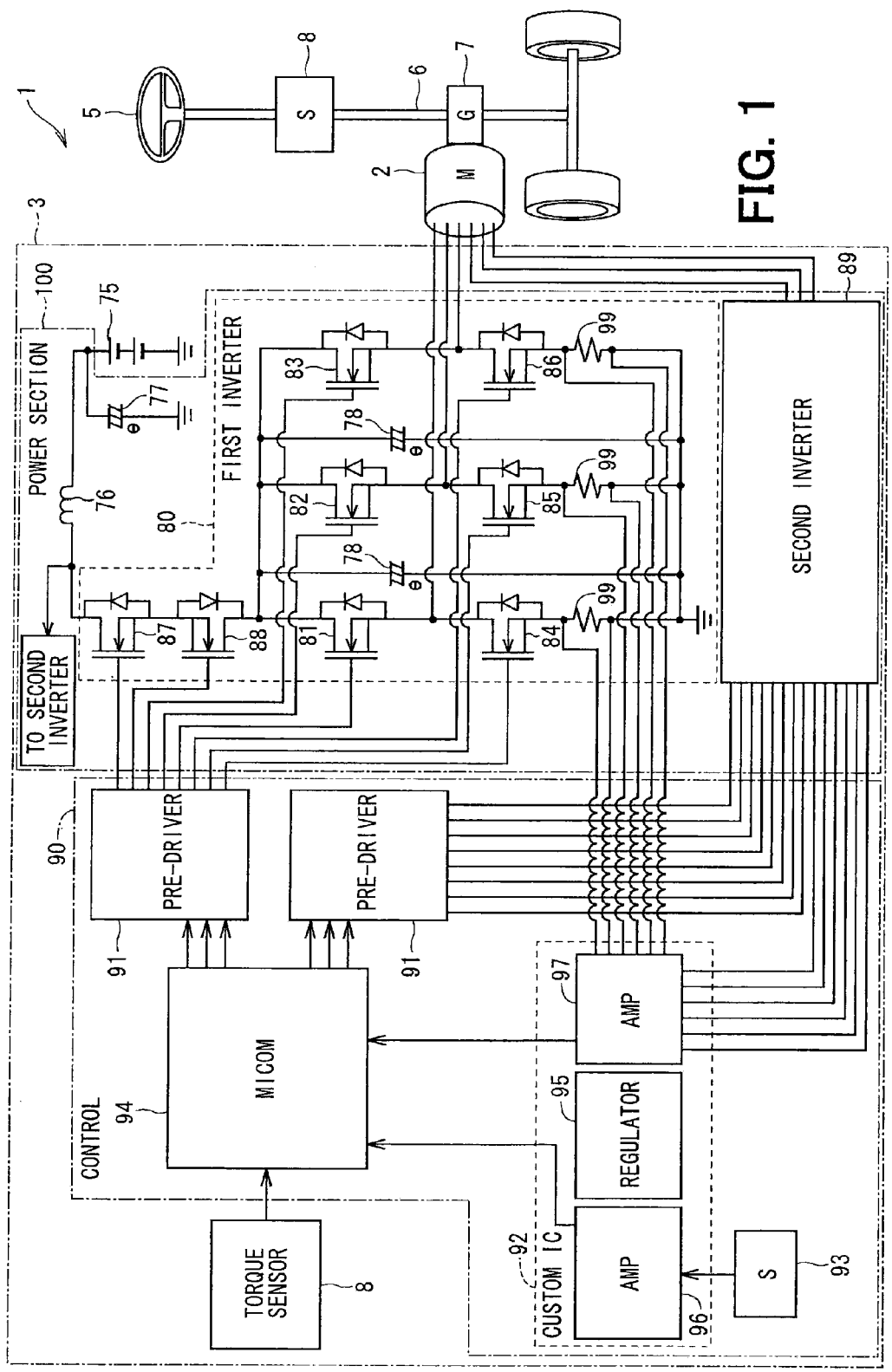
FIG. 1 is a schematic view illustrating a power steering apparatus having a drive device according to a first embodiment.

Referring to FIG. 1, electric construction of the EPS will be explained, which is common in the following embodiments.

As shown in FIG. 1, a vehicle has a steering 5, a column shaft 6, and a gear 7. The drive device 1 produces rotation torque for the shaft 6 through the gear 7, so as to assist the steering 5.

Specifically, when a driver of the vehicle operates the steering 5, steering torque produced in the column shaft 6 by the operation is detected with a torque sensor 8. Further, speed information of the vehicle is acquired from a controller area network (CAN, not shown), so as to assist the steering 5. If such a mechanism is used, not only the assistance of the steering 5 but also automatic control of the steering 5 is possible such as lane keeping in a highway or parking in a motor pool, depending on control technique.

The motor 2 is a three phase brushless motor, and the gear 7 is rotated in both directions. Energization and drive of the motor 2 are controlled by the control unit 3. The control unit 3 has a power section 100 to which drive current is supplied to drive the motor 2, and a control 90 which controls the drive of the motor 2.

The power section 100 has a choking coil 76 placed in a power source line from a power source 75, a capacitor 77, a first inverter 80 and a second inverter 89. The first inverter 80 and the second inverter 89 have the same composition, so that only the first inverter 80 is explained here.

The inverter 80 has metal-oxide-semiconductor field-effect transistor (MOSFET, hereinafter referred as MOS) 81-86 which is a kind of a field effect transistor. In the MOS 81-86, a source and a drain are connected to (ON) or disconnected from (OFF) each other by a gate potential. The MOS 81-86 corresponds to a switching element.

The drain of the MOS 81 is connected to the source line, and the source of the MOS 81 is connected to the drain of the MOS 84. The source of the MOS 84 is connected to the ground. A connection point between the MOS 81 and the MOS 84 is connected to a U phase coil of the motor 2.

The drain of the MOS 82 is connected to the source line, and the source of the MOS 82 is connected to the drain of the MOS 85. The source of the MOS 85 is connected to the ground. A connection point between the MOS 82 and the MOS 85 is connected to a V phase coil of the motor 2.

The drain of the MOS 83 is connected to the source line, and the source of the MOS 83 is connected to the drain of the MOS 86. The source of the MOS 86 is connected to the ground. A connection point between the MOS 83 and the MOS 86 is connected to a W phase coil of the motor 2.

The inverter 80 has a power relay 87, 88, which is constructed by the same MOSFET as the MOS 81-86. The power relay 87, 88 is arranged between MOS 81-83 and the power source 75, and stops the electric current at the time of abnormalities.

The power relay 87 is disposed to intercept the electric current from flowing into the motor 2 when open or short circuit failure is generated. The power relay 88 is arranged to prevent reverse-direction current that is generated when an electronic component such as capacitor 78 is accidentally connected in reverse direction.

A shunt resistor 99 is electrically connected between the MOS 84-86 and the ground. Electric current supplied to the U phase coil, the V phase coil, and the W phase coil is detected by detecting voltage or current of the shunt resistor 99.

The choking coil 76 and the capacitor 77 are electrically connected between the power source 75 and the power relay 87. The choking coil 76 and the capacitor 77 construct a filter circuit, and reduce noise transmitted from other equipment which shares the power source 75. Moreover, noise transmitted from the drive device 1 to the other equipment is also reduced.

The capacitor 78 is electrically connected between a power source side of the MOS 81-83 and a ground side of the MOS 84-86. The capacitor 78 stores charge, thereby assisting the power supply for the MOS 81-86, or controlling noise components such as surge voltage.

The control 90 has a pre-driver 91, a custom IC 92, a rotation angle sensor 93 corresponding to a rotation detecting element, and a microcomputer 94. The custom IC 92 has a regulator 95, an amplifier 96 that amplifies a sensor signal output from the sensor 93, and an amplifier 97 that amplifies a detection voltage.

The regulator 95 is a stabilization circuit which stabilizes the power source, and stabilizes the power source supplied to each part. For example, the microcomputer 94 will operate with the stable prescribed voltage (for example, 5V), due to the regulator 95.

A signal is input into the amplifier 96 from the sensor 93. The sensor 93 detects the rotation position signal of the motor 2, and the detected signal is sent to the amplifier 96. The amplifier 96 amplifies the signal, and outputs the amplified signal to the microcomputer 94. The amplifier 97 detects the both-ends voltage of the shunt resistor 99, amplifies the voltage, and outputs the amplified voltage to the microcomputer 94.

The rotation position signal of the motor 2 and the both-ends voltage of the shunt resistor 99 are input into the microcomputer 94. Moreover, a steering torque signal is input into the microcomputer 94 from the torque sensor 8 attached to the column shaft 6, and the speed information is input into the microcomputer 94 via the CAN. When the steering torque signal and the speed information are input, the microcomputer 94 will control the first inverter 80 through the pre-driver 91 based on the rotation position signal. The steering 5 can be assisted according to the speed.

Specifically, the microcomputer 94 controls the inverter 80 by switching the MOS 81-86 through the pre-driver 91. The gate of the MOS 81-86 is connected to an output terminal of the pre-driver 91, and the MOS 81-86 is switched by changing the gate voltage through the pre-driver 91.

Moreover, the microcomputer 94 controls the inverter 80 based on the both-ends voltage of the shunt resistor 99 input from the amplifier 97, so that current shape supplied to the motor 2 is made close to a sinusoidal wave. The second inverter 89 is controlled by the control 90, similarly to the first inverter 80.

Figure 2:
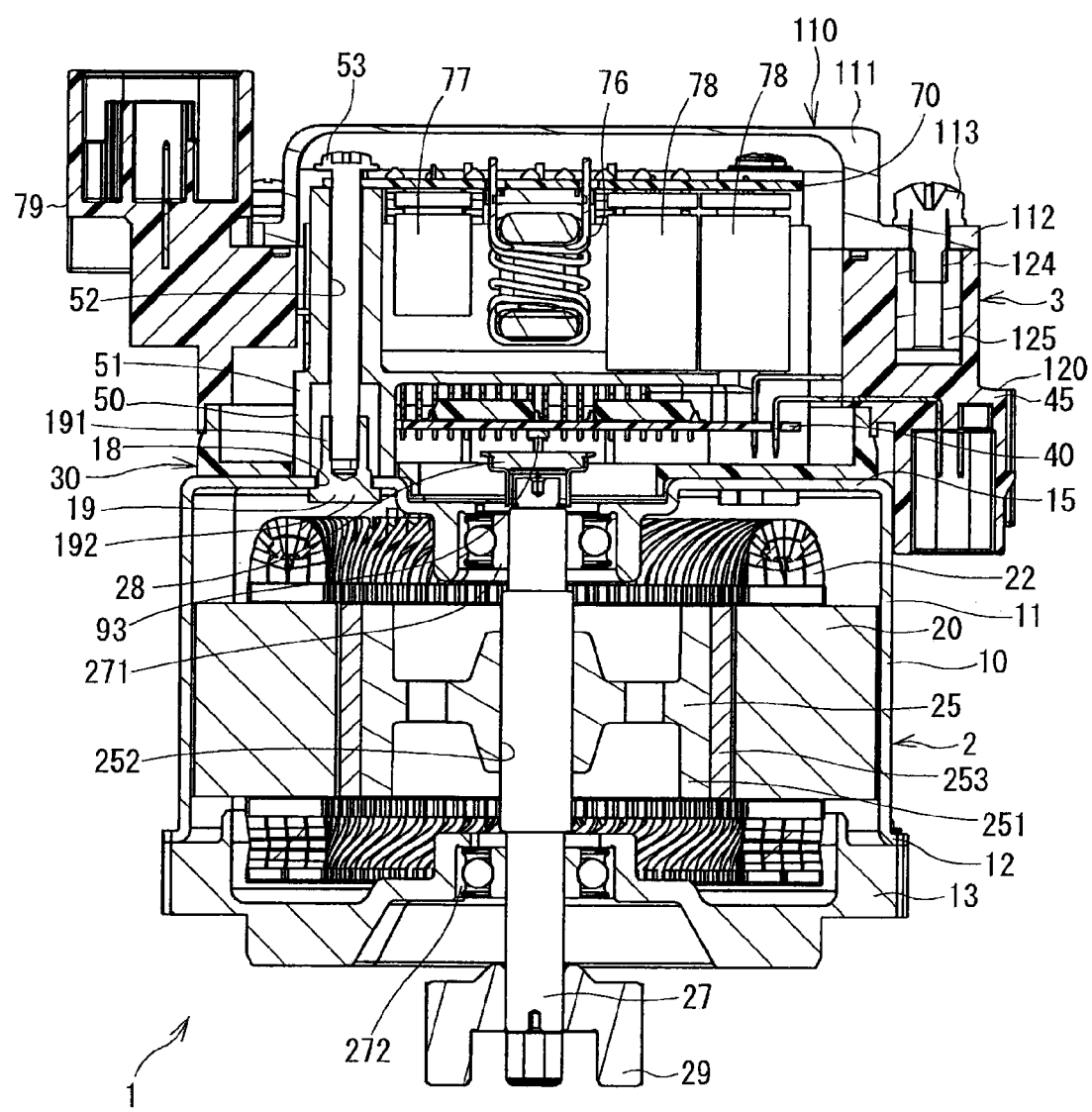
FIG. 2 is a cross-sectional view illustrating the drive device.

A construction of the drive device 1 will be described with reference to FIGS. 2-9. FIG. 2 is a cross-sectional view taken along a line II-II in FIG. 4, and FIG. 3 is a cross-sectional view taken along a line III-III in FIG. 4.

As shown in FIG. 2, the control unit 3 is arranged on an end of the motor 2 in the axis direction of the motor 2. The motor 2 and the control unit 3 have stack (layer) structure.

Figure 3:
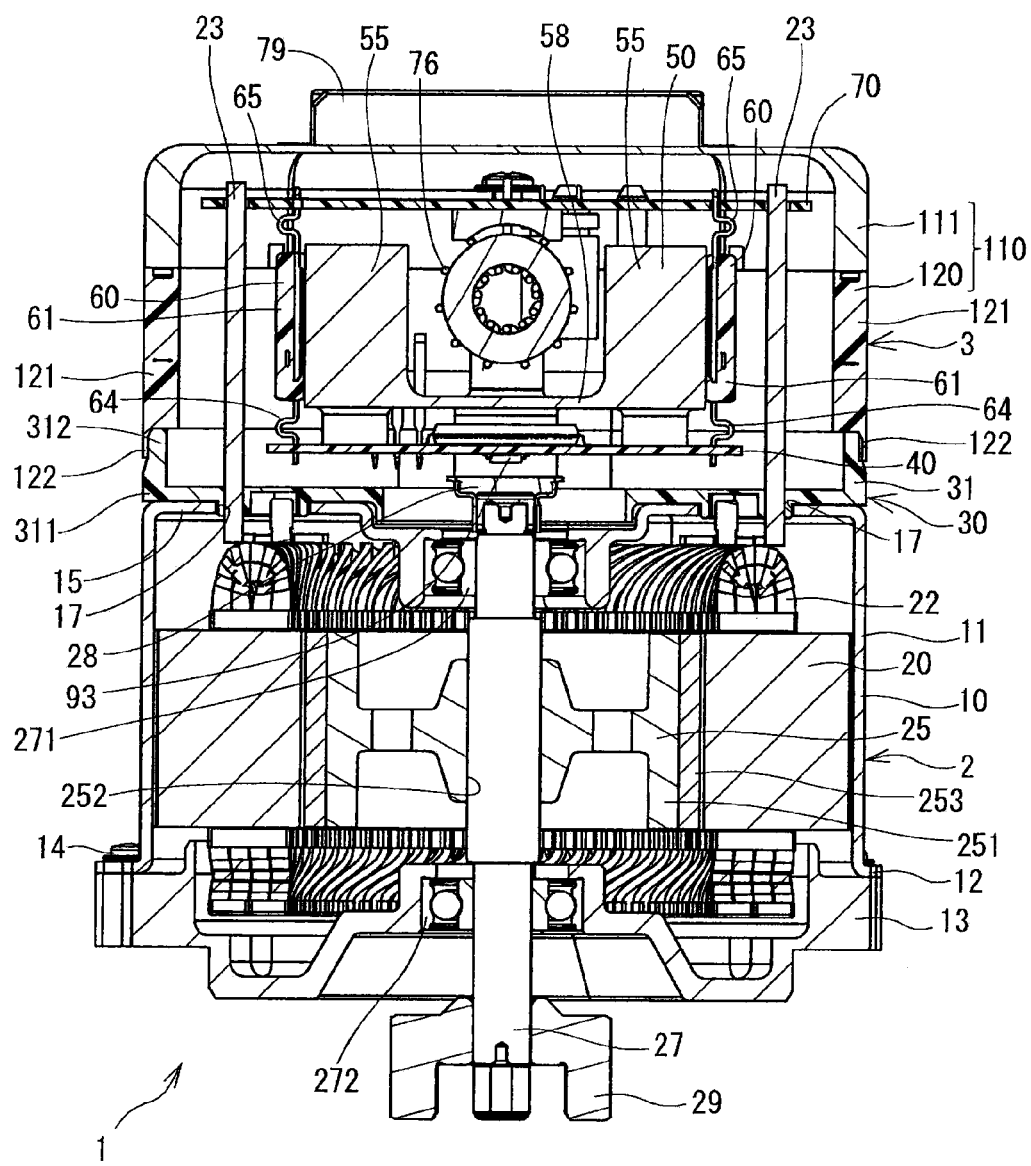
FIG. 3 is a cross-sectional view illustrating the drive device.
Figure 4:
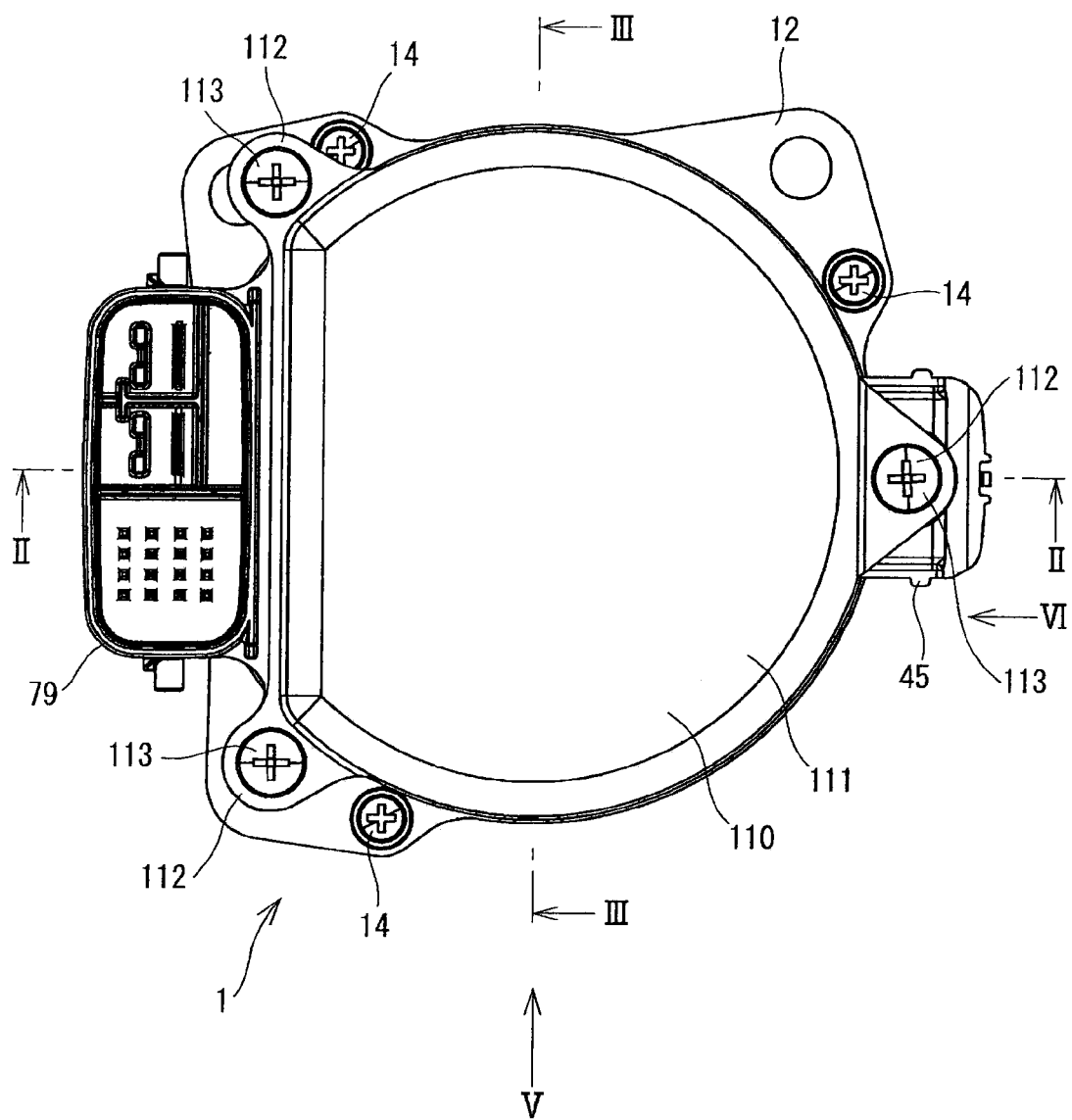
FIG. 4 is a plan view illustrating the drive device.
Figure 5:
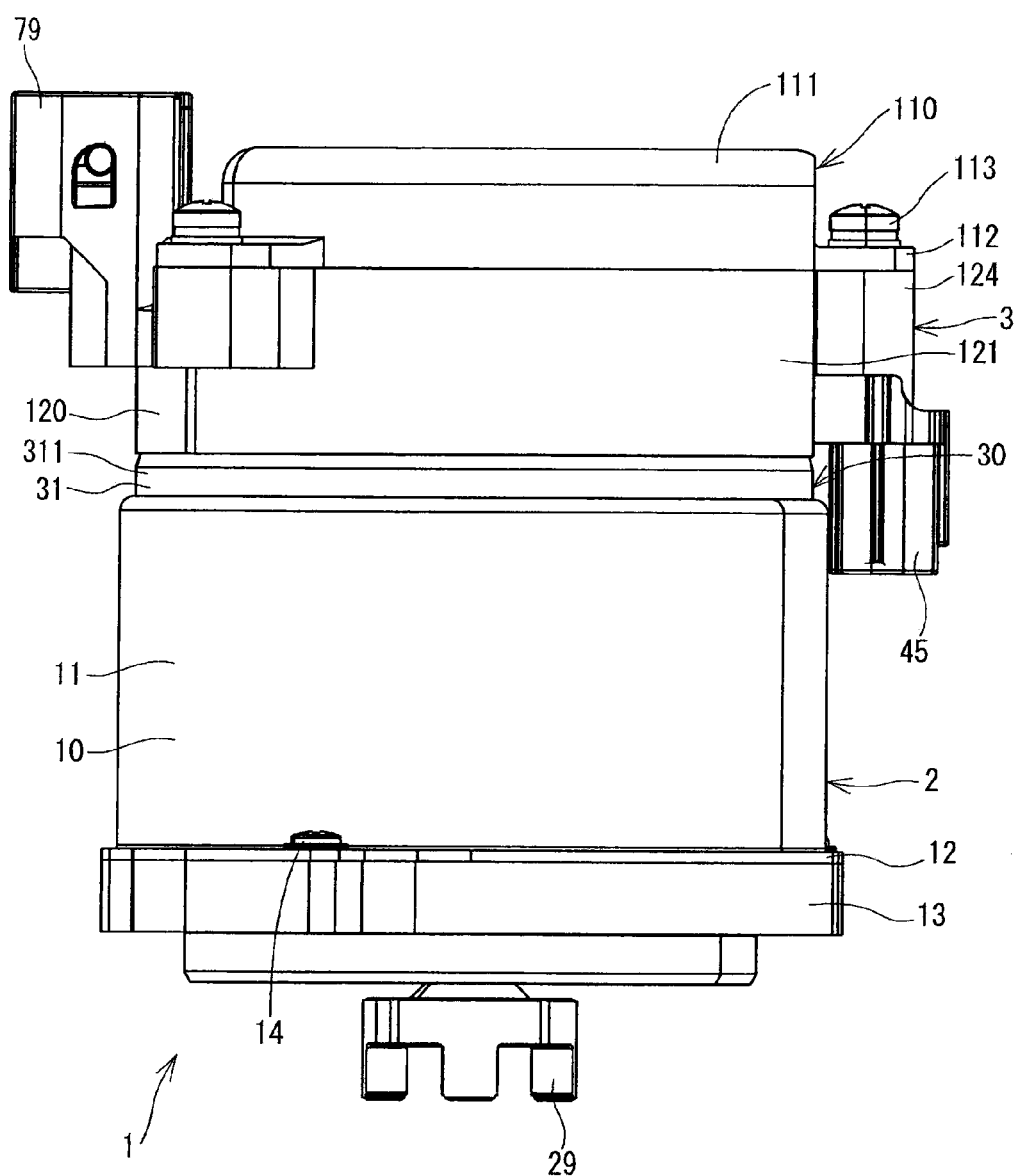
FIG. 5 is a side view seen in a direction of V in FIG. 4.
Figure 6:
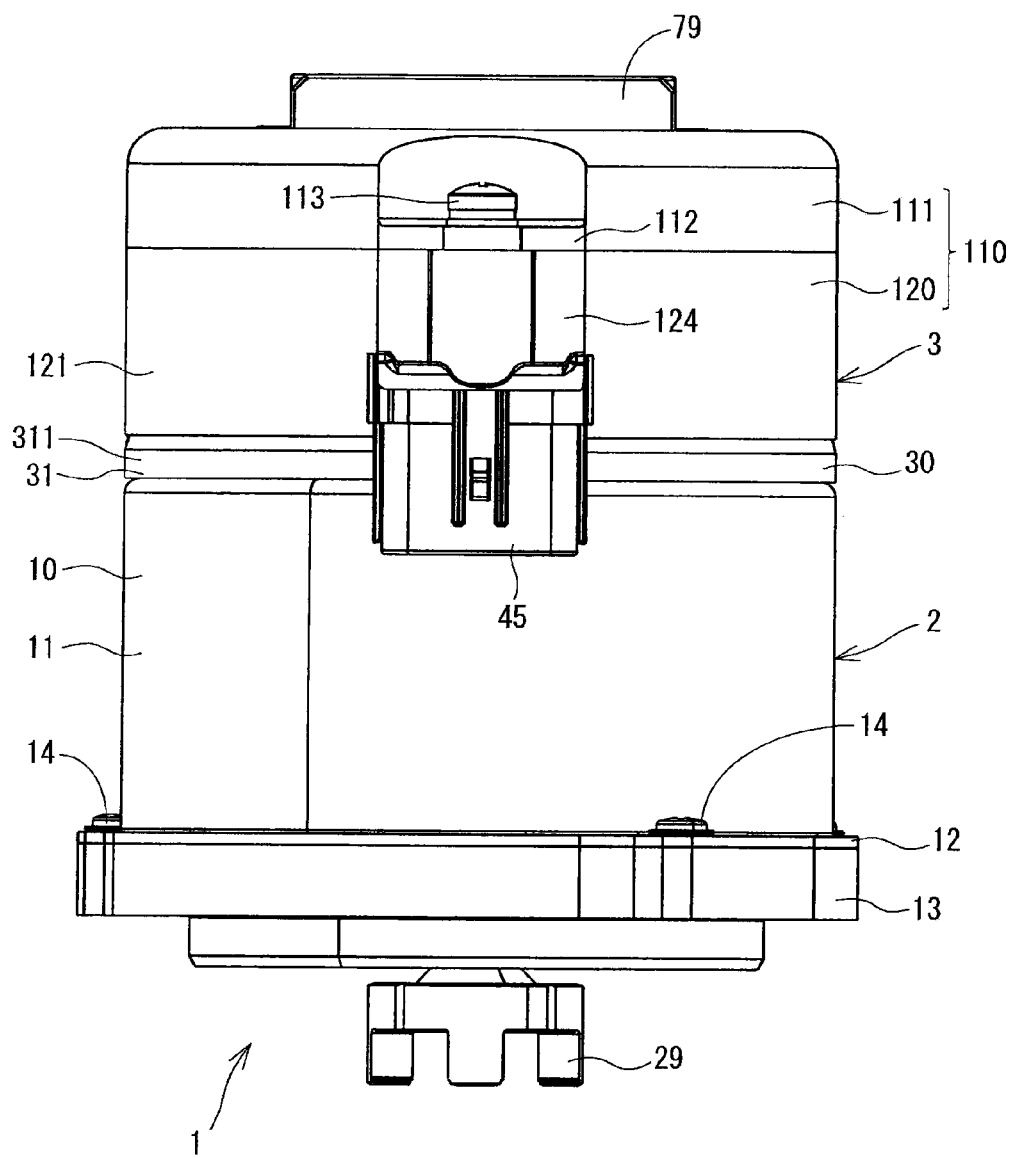
FIG. 6 is a side view seen in a direction of VI in FIG. 4.
Figure 7:
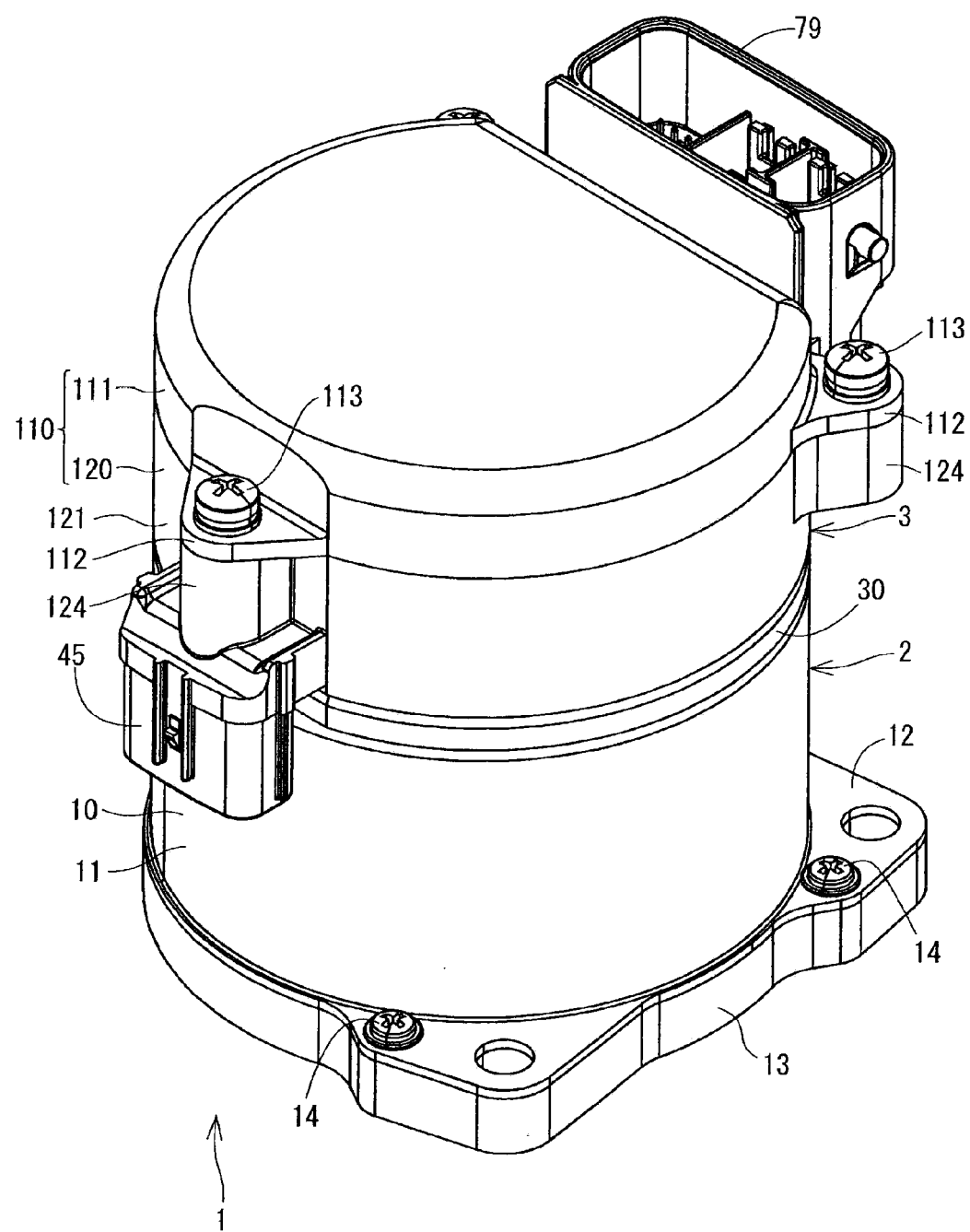
FIG. 7 is a perspective view illustrating the drive device.

The motor 2 is explained based on FIGS. 2 and 3. The motor 2 has a motor case 10, a stator 20 around which a winding wire 22 is wound, a rotor 25, and a shaft 27. The motor case 10 forms an outer shape of the motor 2, and has a peripheral wall 11 and a unit-side wall part 15 opposing to the control unit 3. The case 10 is shaped in a based cylinder, and is made of iron, for example. A flange 12 is arranged on an end of the peripheral wall 11 opposite from the unit-side wall part 15. A flame end 13 made of aluminum, for example, is fixed to the peripheral wall 11 through the flange 12 with a screw 14. A column 19 is arranged to the wall part 15, and the motor 2 and the control unit 3 are directly connected with each other through the column 19.

Figure 8:
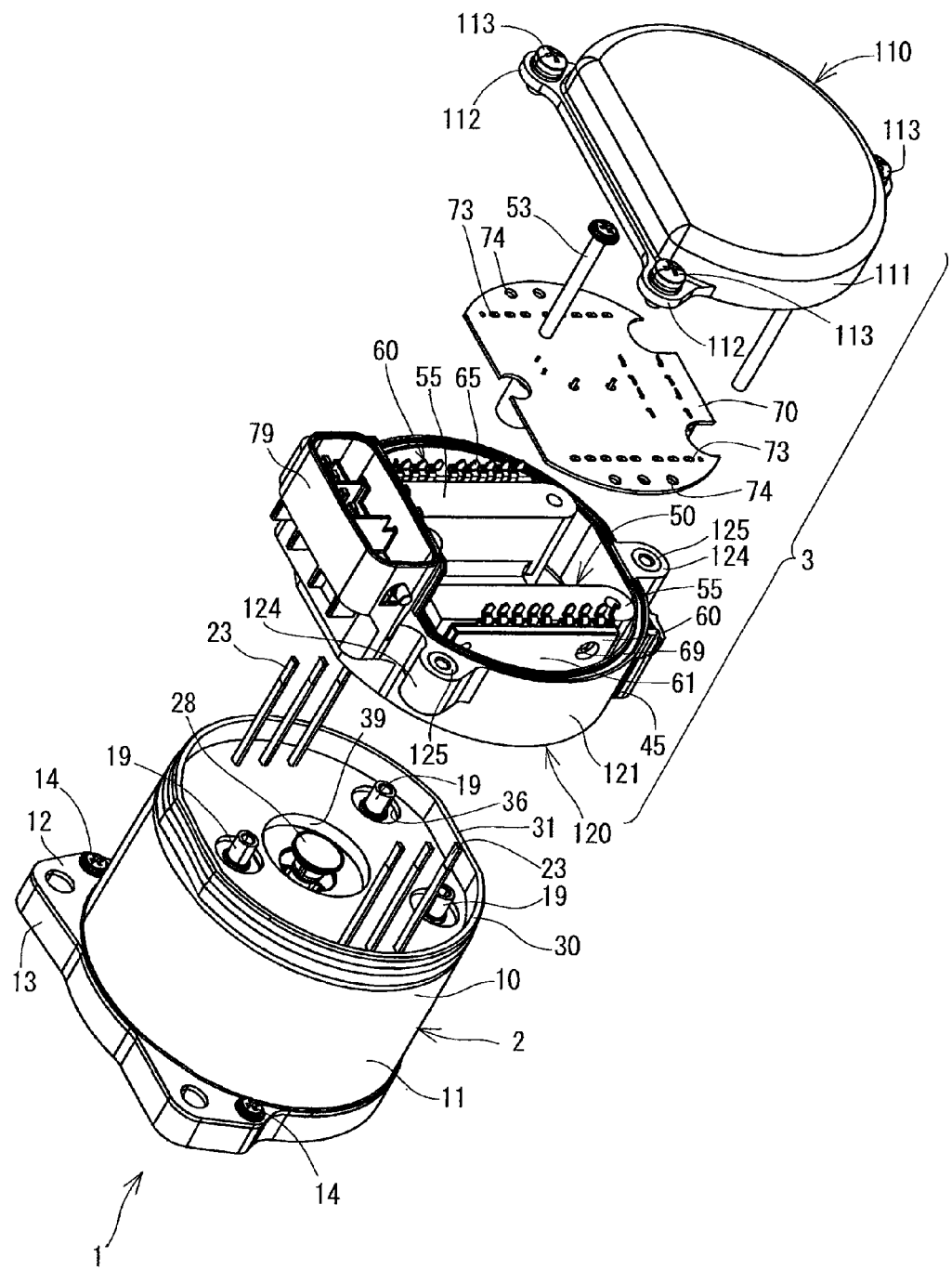
FIG. 8 is an exploded perspective view illustrating the drive device.

As shown in FIGS. 2 and 8, the column 19 is arranged in the unit-side wall part 15 of the motor case 10. The column 19 is embedded and fixed to a column attachment hole 18 defined in the unit-side wall part 15 from the opposite side of the control unit 3. The column 19 is located on inner side of the peripheral wall 11 in the radial direction.

The column 19 is made of aluminum, for example, and has a cylindrical shape. The column 19 has an internal thread part 191 and a block part 192. An internal thread is defined on an inner face of the internal thread part 191 in the radial direction. The internal thread part 191 is inserted into the column attachment hole 18 defined in the unit-side wall part 15, and projects toward the control unit 3 from an insertion hole 36 of a holder 30 to be mentioned later. Further, the internal thread part 191 is inserted into a through hole 52 defined in a leg 51 of a heat sink 50.

A through bolt 53 is inserted into the through hole 52 from the opposite side of the motor case 10, and has a male thread on the end portion. The bolt 53 is tightened with the column 19 inside the through hole 52. Thereby, the unit-side wall part 15 of the motor case 10 and the heat sink 50 of the control unit 3 are directly connected on the inner side of the peripheral wall 11 in the radial direction. The block part 192 has a diameter larger than that of the column attachment hole 18, and is arranged in the motor case 10. The block part 192 closes the hole 18 on the opposite side of the control unit 3. Even if a foreign matter such as cut chip is generated when the through bolt 53 and the column 19 are connected with each other, the foreign matter cannot enter the motor case 10.

The stator 20 is arranged inside the motor case 10. The stator 20 has sixty poles projected inward in the radial direction. The pole has a layer-built iron core which is produced by layering thin boards made of magnetic material, and an insulator which fits to outside of the iron core in an axis direction of the iron core. The winding wire 22 is wound around the insulator, and constructs a three phase winding wire which consists of the U phase coil, the V phase coil, and the W phase coil.

As shown in FIG. 8, six wires 23 are taken out from the winding wire 22. The taken-out wire 23 extends toward the control unit 3 from a hole 17 defined in the unit-side wall part 15 of the motor case 10, as shown in FIG. 3. The wire 23 taken out toward the control unit 3 extends in outer side of a control board 40 and a power module 60 in the radial direction, and is connected to a power board 70. That is, when seen in the axis direction of the motor 2, the taken-out wire 23 is located on the outer side of the power module 60 in the radial direction. Moreover, the taken-out wire 23 is extended to the power board 70 by striding the power module 60 on the outer side area of the power module 60 in the radial direction. The hole 17 corresponds to an opening defined in the unit-side wall part 15 of the motor case 10.

The rotor 25 is arranged in the stator 20 in the radial direction, and is rotatable with respective to the stator 20. The rotor 25 has a cylindrical shape, and is made of magnetic material such as iron. The rotor 25 has a rotor core 251 and a permanent magnet 253 arranged outside of the rotor core 251 in the radial direction. The permanent magnet 253 alternately has N-poles and S-poles.

The shaft 27 is fixed in a shaft hole 252 defined in axial center of the rotor core 251. The shaft 27 is rotatably supported by a bearing 271 of the motor case 10 and a bearing 272 of the flame end 13. Thereby, the shaft 27 can rotate with the rotor 25 relative to the stator 20. An end portion of the shaft 27 adjacent to the control unit 3 passes through a shaft hole defined in axial center of the wall part 15 of the motor case 10. Thereby, the end portion of the shaft 27 is exposed from the motor case 10 toward the control unit 3. The shaft hole has a diameter larger than the outer diameter of the shaft 27, and the motor case 10 does not regulate the rotation of the shaft 27.

The end portion of the shaft 27 has a magnet 28 integrally rotating with the shaft 27. The magnet 28 is coaxially fixed to a magnet holder arranged on the end portion of the shaft 27, and is exposed to the control unit 3. The shaft 27 does not penetrate the control board 40, and the magnet 28 is arranged near a face of the control board 40 opposing to the motor 2.

The shaft 27 has an output end 29 at the end opposite from the control unit 3. A gear box (not shown) having the gear 7 inside is arranged at the end of the shaft 27 opposite from the control unit 3. The gear 7 is connected with the output end 29, and is rotated by the rotation of the shaft 27.

Next, the control unit 3 is explained based on FIGS. 2-9. The control unit 3 has the control board 40, the heat sink 50 corresponding to a receiving member, the power module 60 corresponding to a semiconductor module, the power board 70, a cover 110, and a connector holder 120.

A motor case region is defined by projecting the motor case 10 in the axis direction. Approximately most of the construction of the control unit 3 except a connector 45 and a connector 79 (FIG. 5) used for connection with external electronic components is included in the motor case region.

Figure 9:
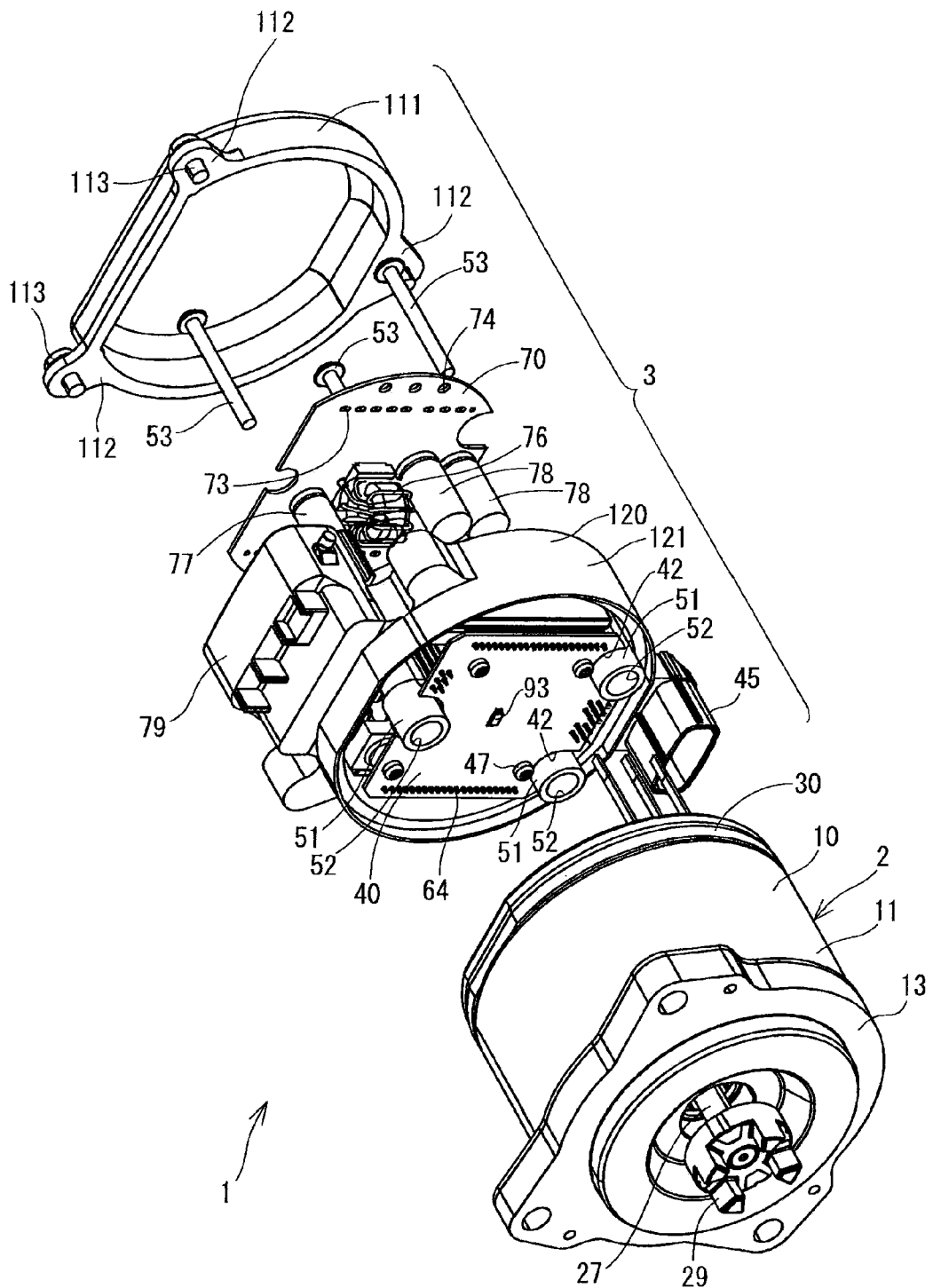
FIG. 9 is an exploded perspective view illustrating the drive device.
Figure 10:
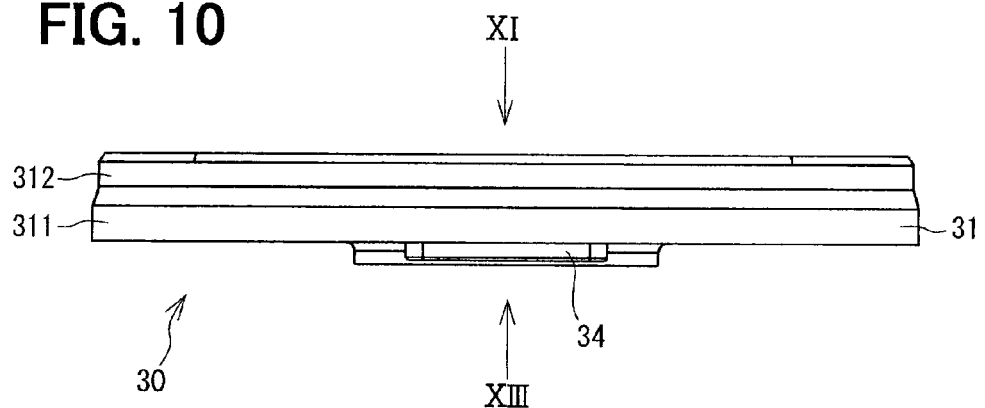
FIG. 10 is a side view illustrating a holder of the drive device.

As shown in FIGS. 8 and 9, the control board 40, the heat sink 50 and the power module 60, and the power board 70 are arranged in this order from the side of the motor 2 in the axis direction. That is, the motor case 10, the control board 40, the heat sink 50 and the power module 60, and the power board 70 are arranged in this order in the axis direction.

The control board 40 is a four-layer board made of glass epoxy board, for example, and is accommodated in the motor case region. The control board 40 has three cutouts 42 at positions corresponding to the leg 51 of the heat sink 50 for an assembling time when the heat sink 50 is assembled to the motor case 10. The control board 40 is connected to the heat sink 50 from the side of the motor 2 using a screw 47, for example.

Several kinds of electronic components which construct the control 90 are mounted to the control board 40. The pre-driver 91, the custom IC 92, and the microcomputer 94 (which are shown in FIG. 1) are mounted on a face of the control board 40 opposite from the motor 2. The rotation angle sensor 93 is mounted on a face of the control board 40 opposing to the motor 2. The rotation angle sensor 93 is located at a position opposing to the magnet 28. The magnet 28 and the rotation angle sensor 93 are coaxially arranged on the rotation center of the shaft 27. The rotation angle sensor 93 detects a variation in magnetic field that is generated by the rotation of the magnet 28, thereby detecting the rotation angle of the shaft 27.

Through holes used for connecting with a control terminal 64 of the power module 60 are defined along outer periphery of the control board 40. A control connector 45 is connected to the control board 40.

The control connector 45 is arranged in the connector holder 120 to be mentioned later. The control connector 45 is located outside of the motor case 10 in the radial direction, and the wiring extending from the motor 2 is connectable to the connector 45 in the axis direction. Signals are input into the connector 45 from the torque sensor 8 or the CAN.

The heat sink 50 is made of a material having high thermal conductivity, such as aluminum. The heat sink 50 has the leg 51 in the periphery of the heat sink 50, and contacts the unit-side wall part 15 of the motor case 10. For example, the leg 51 is arranged at three positions corresponding to the column 19. The leg 51 has a through hole 52 extending in the axis direction.

The heat sink 50 has a heat receiver 55 with a wide face that opposes to the taken-out wire 23. The heat receiver 55 extends upward in a direction from the unit-side wall part 15 of the motor case 10, and is approximately perpendicular to the wall part 15. The heat receiver 55 has a base connector 58. The heat sink 50 is integrally formed with the heat receiver 55 and the base connector 58 so as to have U-shape cross-section as a whole, as shown in FIG. 3. Two of the heat receivers 55 are arranged parallel with each other, and the power module 60 is arranged along each of the heat receivers 55.

The power module 60 is vertically arranged outside of the heat sink 50 in the radial direction of the motor 2. A heat radiation sheet (not shown) is disposed between the power module 60 and the heat sink 50. The power module 60 and the radiation sheet are mounted to the heat sink 50 using a screw 69, for example, so that the heat sink 50 holds the power module 60 and the radiation sheet. Thereby, the power module 60 is held by the heat sink 50 through the radiation sheet. Heat generated by electricity supply is radiated to the heat sink 50 through the radiation sheet.

A wiring pattern (not shown) corresponding to a metal radiator is arranged on a face of the power module 60 opposing to the heat receiver 55, and is partially exposed from a mold part 61 of the power module 60. The metal radiator contacts the heat receiver 55 of the heat sink 50 through the radiation sheet, so that heat can be radiated efficiently. The radiation sheet transmits heat from the power module 60 to the heat receiver 55, and secures insulation between the power module 60 and the heat receiver 55. That is, the radiation sheet works as an insulation member other than the heat radiator.

The power module 60 has the MOS 81-86 (refer to FIG. 1) which is a switching element switching power supply for the winding wire. The power module 60 has a wiring pattern made with copper, and the MOS 81-88 and the shunt resistor 99 are arranged on the power module 60. The wiring pattern is electrically connected to the MOS 81-88 with a wire, for example, and is molded by a mold part 61.

A relationship between the circuit construction shown in FIG. 1 and the power module 60 will be described below. One of the power modules 60 corresponds to the first inverter 80, and has the MOS 81-86, the power relay 87, 88, and the shunt resistor 99 shown in FIG. 1. Resin mold is integrally performed for the MOS 81-86, the power relay 87, 88, and the shunt resistor 99 as one module.

Moreover, the other power module 60 corresponds to the second inverter 89, and has the MOS, the power relay, and the shunt resistor which construct the second inverter 89. That is, one power module corresponds to one inverter circuit in this embodiment. In other word, one power module which constructs one drive system is arranged to correspond to one heat receiver.

The power module 60 has a control terminal 64 and a power terminal 65 which are projected from the mold part 61. The control terminal 64 is formed on a face of the module 60 that is approximately vertical to the longitudinal direction of the wide face of the mold part 61. The power terminal 65 is formed on a face parallel to the face having the control terminal 64.

The power module 60 is vertically arranged along the heat receiver 55 of the heat sink 50, so that the control terminal 64 is located to oppose the control board 40 and that the power terminal 65 is located to oppose the power board 70. That is, the control terminal 64 is arranged to protrude to the control board 40, and the power terminal 65 is arranged to protrude to the power board 70.

The control terminal 64 is inserted into a through hole defined in the control board 40, and is electrically connected with the control board 40 by solder, for example. A control signal is output from the control board 40 to the power module 60 through the control terminal 64.

The power terminal 65 is inserted into a through hole 73 defined in the power board 70, and is electrically connected with the power board 70 by solder, for example. Winding current supplied to the winding wire 22 is transmitted to the power module 60 via the power terminal 65.

Only a small electric current (for example, 200 mA) is supplied to the control board 40, that is enough for the drive control of the motor 2, in the present embodiment. In contrast, a large amount of electric current (for example, 80 A) is supplied to the power board 70, and is used for driving the motor 2. Therefore, the power terminal 65 is thicker than the control terminal 64.

The power board 70 is a four-layer board made with a glass epoxy board, and has thick pattern made of copper foil, for example. The power board 70 has a board shape settled in the motor case region, and is mounted to the heat sink 50 from the opposite side of the motor 2 using a screw, for example. The power board 70 has a power wiring to which the winding current is supplied. The winding current is supplied to the winding wire 22.

The power board 70 has the through hole 73, and the power terminal 65 of the power module 60 passes through the hole 73. As shown in FIG. 8. a through hole 74 is formed on the outer side of the through hole 73 in the radial direction, and the taken-out wire 23 passes through the hole 74. The wire 23 is inserted into the through hole 74, and is electrically connected with the power board 70 by solder, for example. Thereby, the wire 23 is connected with the power module 60 through the power board 70.

As shown in FIG. 2, the choking coil 76 and the capacitor 77, 78 are mounted on a face of the power board 70 opposing to the motor 2. The choking coil 76 and the capacitor 77, 78 are arranged in a space defined inside the heat sink 50. The choking coil 76 and the capacitor 77, 78 are located between the power board 70 and the control board 40 in the axis direction.

The choking coil 76 has a cylindrical shape, and the length of the coil 76 in the axis direction is smaller than the length of the coil 76 in the radial direction. The axis of the choking coil 76 is approximately perpendicular to the center line of the shaft 27, that is, the coil 76 is arranged to extend vertically. The capacitor 77, 78 is an aluminum electrolytic capacitor. The number of the capacitors 78 is four, and the capacitor 78 has a capacitance larger than that of the capacitor 77. The capacitor 77, 78 may be other capacitor other than the aluminum electrolytic capacitor depending on its capacitance.

Moreover, the power connector 79 is connected to the power board 70, and is arranged in the connector holder 120 to be mentioned later. For example, the power connector 79 is located on the opposite side of the control connector 45 with respect to the rotation center of the motor 2. The power connector 79 is arranged to be connectable to a wiring from the opposite side of the motor 2 in the axis direction, and is connected with the power source 75. Electric power is supplied to the power board 70 from the power source 75 via the power connector 79. Moreover, the electric power supplied from the power source 75 is supplied to the winding wire 22 wound around the stator 20 via the power connector 79, the power board 70, the power module 60, and the taken-out wire 23.

The cover 110 has an end cover 111 and the connector holder 120, and accommodates the control board 40, the heat sink 50, the power module 60, and power board 70 in the radial direction. The end cover 111 is located opposite from the motor 2 in the axis direction. The end cover 111 has a diameter approximately the same as the motor case 10, and is made of magnetic material such as iron. The end cover 111 prevents the electric field and the magnetic field from leaking from the control unit 3 to outside, and prevents dust from entering inside the control unit 3. The end cover 111 has a connector 112 which projects outward in the radial direction.

The connector holder 120 works as a connector to be connected to external electronic components, and forms the outer shape of the control unit 3. The connector holder 120 is made of resin and is integrally defined by a cylindrical part 121, the control connector 45, and the power connector 79. The connector holder 120 has a connector 124 at a position corresponding to the connector 112 of the end cover 111. The connector 124 protrudes outward in the radial direction, and an insert nut 125 is embedded in the connector 124. A screw 113 passes through the connector 112 of the end cover 111, and is tightened with the insert nut 125, thereby fixing the end cover 111 to the connector holder 120. Moreover, as shown in FIG. 3, a part of the cylindrical part 121 opposing to the motor 2 has a thin-wall part 122. The thin-wall part 122 is defined by forming a step inside of the cylindrical part 121 in the radial direction.

Figure 11:
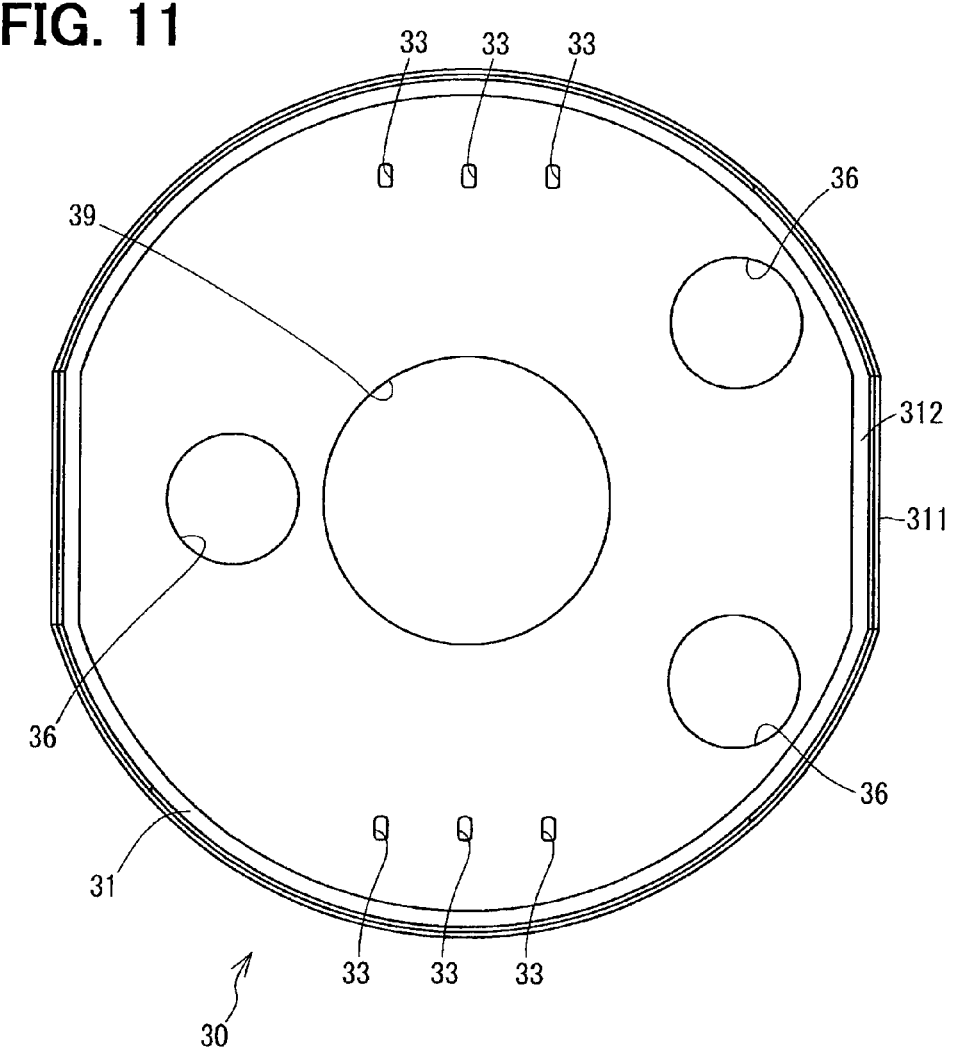
FIG. 11 is a plan view seen in a direction of XI in FIG. 10.
Figure 12:
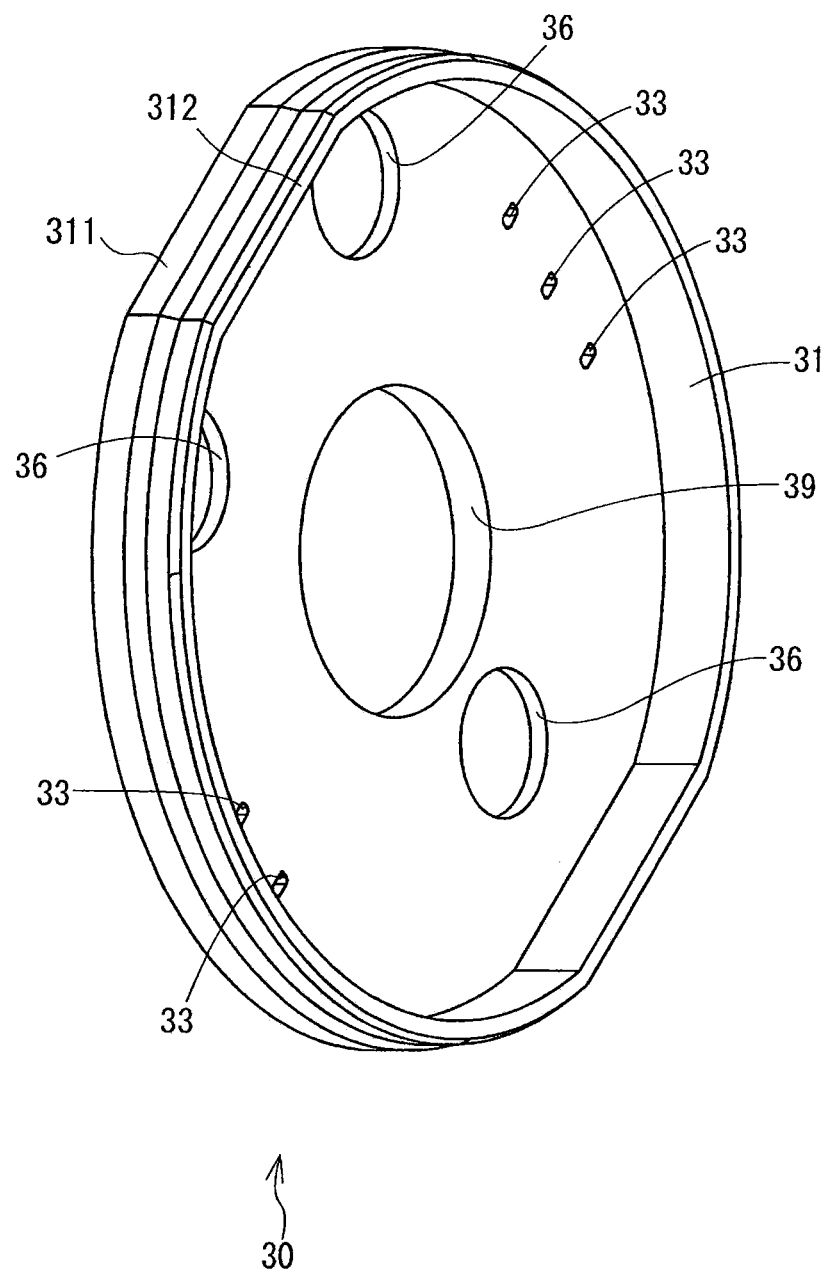
FIG. 12 is a perspective view illustrating the holder of the drive device.
Figure 13:
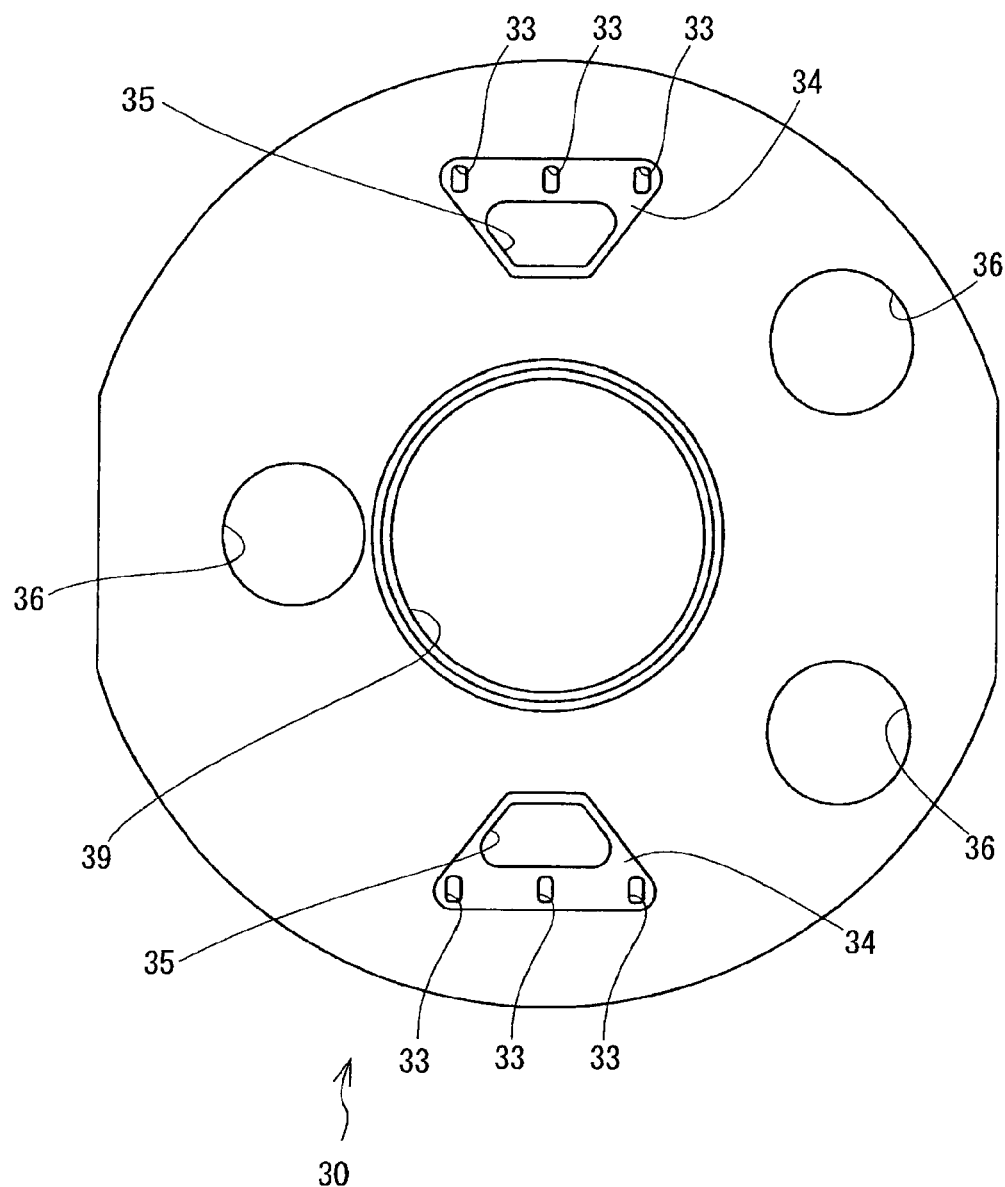
FIG. 13 is a bottom view seen in a direction of XIII in FIG. 10.
Figure 14:
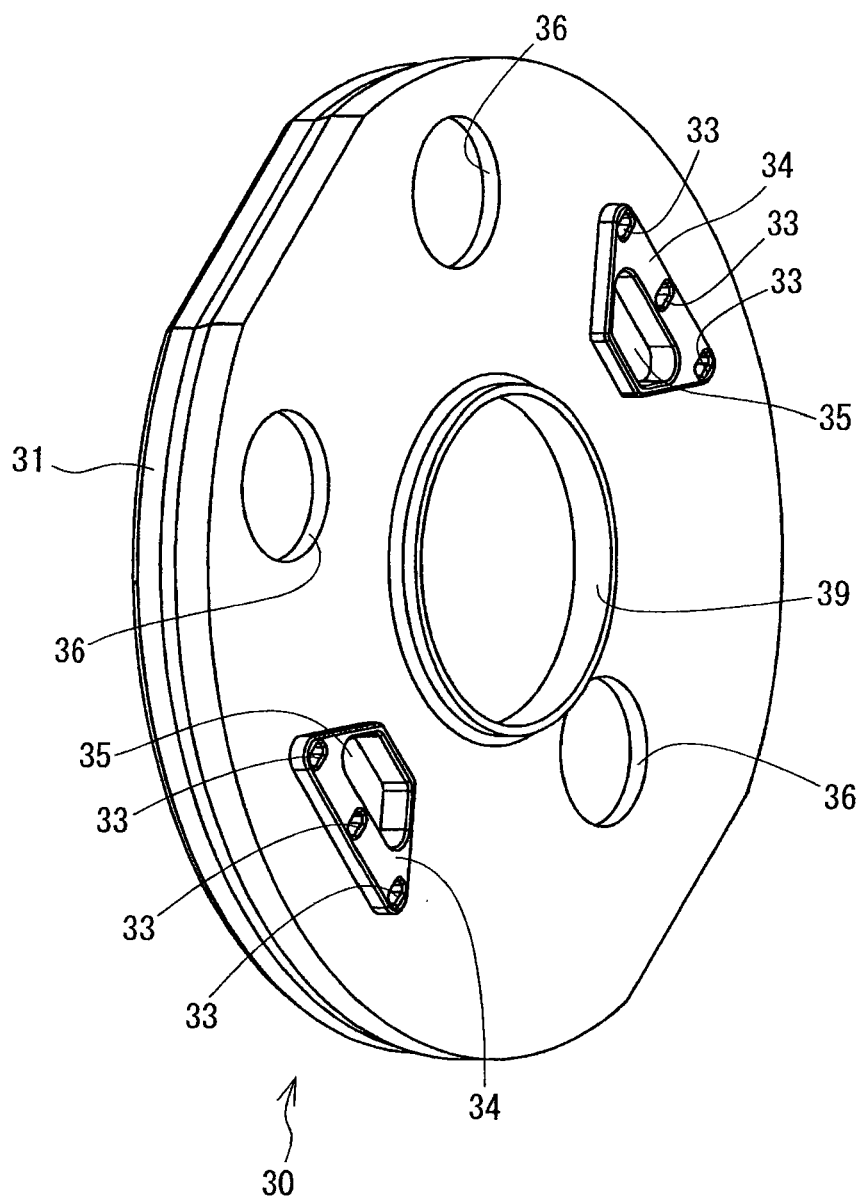
FIG. 14 is a perspective view illustrating the holder of the drive device.

The holder 30 is arranged between the motor 2 and the control unit 3, and is described with reference to FIGS. 10-14. FIG. 12 is a perspective view of the holder 30 seen from the side of the control unit 3, and FIG. 14 is a perspective view of the holder 30 seen from the side of the motor 2. The holder 30 has an approximately disc shape having a diameter approximately the same as the motor case 10. The holder 30 is made of resin, for example.

The holder 30 has a wall part 31 extending toward the control unit 3, and the wall part 31 is formed around all the outer periphery of the holder 30. The wall part 31 has a first wall 311 and a second wall 312. The first wall 311 extends along the outer periphery. The second wall 312 is located between the first wall 311 and the control unit 3 in the axis direction, and is located on the inner side of the first wall 311 in the radial direction.

As shown in FIG. 3, the second wall 312 is inserted to the inner side of the thin-wall part 122 of the connector holder 120 in the radial direction, and the holder 30 and the connector holder 120 fit with each other. The holder 30 and the connector holder 120 are contact with each other over all the circumference, so that invasion of foreign matter from outside to the drive device 1 in the radial direction is reduced.

A hole 33 is defined in the holder 30 on the inner side of the wall part 31 in the radial direction. The hole 33 is located on the outer side of the power module 60 of the control unit 3 in the radial direction. For example, as shown in FIG. 11, two sets of three holes 33 are defined on each side to oppose with each other. The hole part 33 has a shape corresponding to the taken-out wire 23, and has an outer circumference slightly larger than that of the taken-out wire 23. The taken-out wire 23 is inserted into the hole 33 one by one. Moreover, as shown in FIGS. 13 and 14, a fitting part 34 is defined on the holder 30 at a position corresponding to the hole part 33, and is projected toward the motor 2.

The fitting part 34 has a shape to be fitted with the hole 17 defined in the wall part 15 of the motor case 10, and has a predetermined thickness in the axis direction. The fitting part 34 has an approximately trapezoid shape, for example, when seen from the axis direction. The positioning of the wire 23 is determined by being inserted into the hole 33 defined in the fitting part 34, and the taken-out wire 23 is held to extend in a predetermined direction. That is, the hole 33 of the fitting part 34 corresponds to a guide part.

Because the holder 30 is made of resin, the insulation between the taken-out wires 23 and the insulation between the wire 23 and the motor case 10 are secured. The fitting part 34 has an escape area 35 on the inner side of the hole 33 in the radial direction. A part protruding from the winding wire 22 is accommodated in the escape area 35. The escape area 35 is a concave portion, and does not extend toward the control unit 3.

An insertion hole 36 is defined in the holder 30 at a position corresponding to the column 19 and the leg 51 of the heat sink 50. The leg 51 of the heat sink 50 is inserted into the hole 36, so that the holder 30 does not interfere with the connection between the column 19 and the bolt 53. Moreover, a shaft hole 39 is defined in the center of the holder 30, and the end portion of the shaft 27 opposing to the control unit 3 passes through the shaft hole 39.

Operation of the drive device 1 will be described below. The microcomputer 94 disposed on the control board 40 generates pulse signal based on the signals output from the rotation angle sensor 93, the torque sensor 8, and the shunt resistor 99. The signal is modulated by a PWM control through the pre-driver 91 in a manner that the steering 5 is assisted according to the vehicle speed.

The pulse signal is output to the two inverters 80 and 89 constructed with the power module 60 via the control terminal 64, so as to control the switching of the MOS 81-86. Sinusoidal-wave currents having different phases are supplied to each phase of the winding wire 22, so that a rotating magnetic field is generated. Due to the rotating magnetic field, the rotor 25 and the shaft 27 are integrally rotated. When the shaft 27 is rotated, drive force is output to the gear 7 of the column shaft 6 from the output end 29, so that the steering 5 is assisted. That is, the motor 2 is driven by the winding current supplied to the winding wire 22. In this meaning, the winding current supplied to the winding wire 22 corresponds to a drive current which drives the motor 2.

Heat is generated when the MOS 81-88 of the power module 60 is switched, and the heat is radiated to the heat sink 50 through the radiation sheet. Therefore, failure and malfunction caused by a rise in temperature of the power module 60 are prevented. In addition, the size of the stator 20 or the rotor 25 may be changed according to the output demanded.

According to the first embodiment, the drive device 1 includes the motor 2, the control unit 3 and the holder 30. The motor 2 has the motor case 10, the stator 20, the rotor 25 and the shaft 27. The motor case 10 has a cylindrical shape, and defines an outer shape of the motor 2. The stator 20 is arranged in the motor case in a radial direction, and a winding wire 22 is wound around the stator 20 so as to define plural phases. The rotor 25 is arranged in the stator 20 in the radial direction, and is rotatable relative to the stator 20. The shaft 27 is rotated with the rotor 25. The control unit 3 includes the power module 60, the heat sink 50 and the cover 110, and is arranged on a side of the motor 2 in the axis direction. The power module 60 has the MOS 81-86 which switches electricity supply to the winding wire 22. The heat sink 50 receives the power module 60. The cover 110 accommodates the power module 60 and the heat sink 50 in the radial direction. The holder 30 is arranged between the motor 2 and the control unit 3, and has the wall part 31 around the outer circumference of the holder 30. The wall part 31 is fitted with the connector holder 120 of the control unit 3.

Therefore, the holder 30 and the control unit 3 fit with each other, so that a foreign object can be prevented from entering a space between the motor 2 and the control unit 3 from outside, due to the fitting. In particular, invasion of the foreign object into the control unit 3 is restricted.

The wall part 31 of the holder 30 is formed all the circumference of the holder 30. Thereby, invasion of the foreign object can be reduced effectively.

The holder 30 has the hole 33 through which the taken-out part 23 of the winding wire 22 is inserted. Thereby, the winding wire 22 can be easily connected to the control unit 3.

The hole 33 of the holder 30 supports the taken-out wire 23 so that the wire 23 can extend in a predetermined direction. Thereby, the wire 23 can be taken out in the suitable predetermined direction.

The holder 30 is made with the insulating material. Thereby, it is not necessary to prepare separately a component for insulation between the motor case 10 and the taken-out part 23 of the winding wire 22. Thus, the number of components can be reduced.

The holder 30 has the fitting part 34 projected toward the motor case 10, and the fitting part 34 fits the hole 17 defined in the unit-side wall part 15 of the motor case 10. Thereby, invasion of the foreign object to the motor case 10 can be reduced effectively.

The wall part 31 of the holder 30 is fitted with the connector holder 120 by being inserted on the inner side of the cover 110 in the radial direction. Thereby, the inside space of the cover 110 can be secured as large in the radial direction, and invasion of the foreign object to the control unit 3 can be reduced.

Second Embodiment

Figure 15:
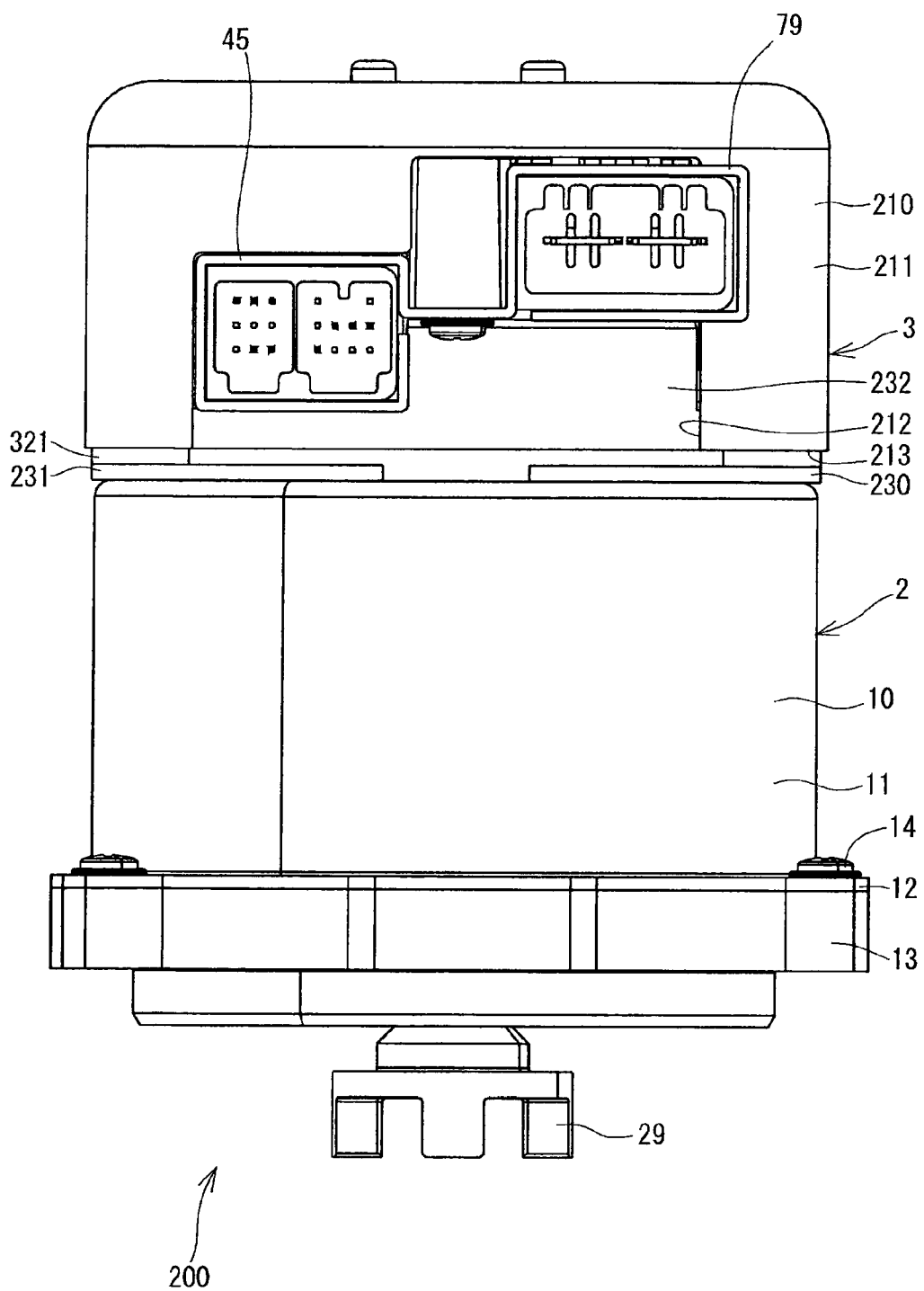
FIG. 15 is a side view illustrating a drive device according to a second embodiment.
Figure 16:
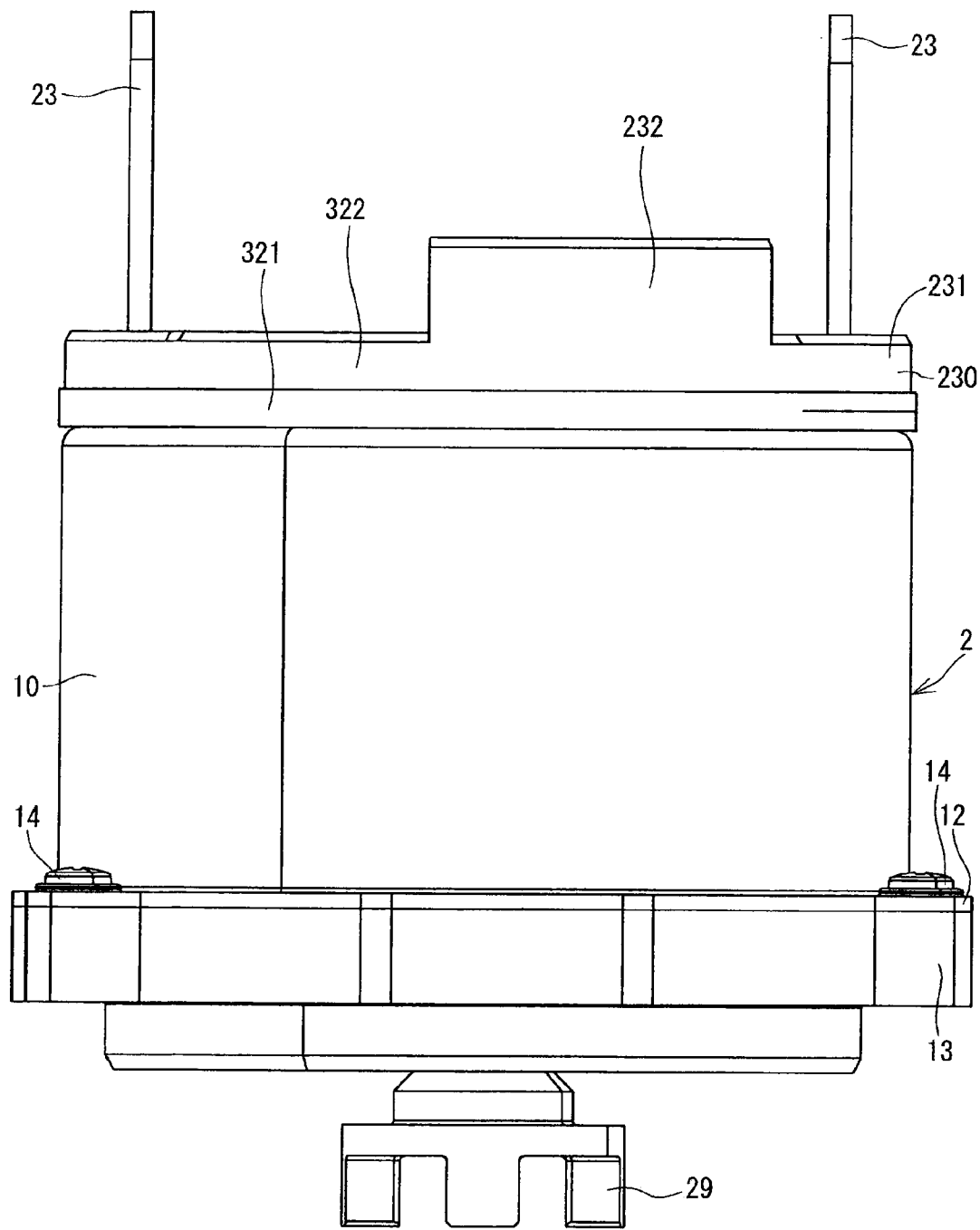
FIG. 16 is a side view illustrating a motor and a holder of the drive device of the second embodiment.
Figure 17:
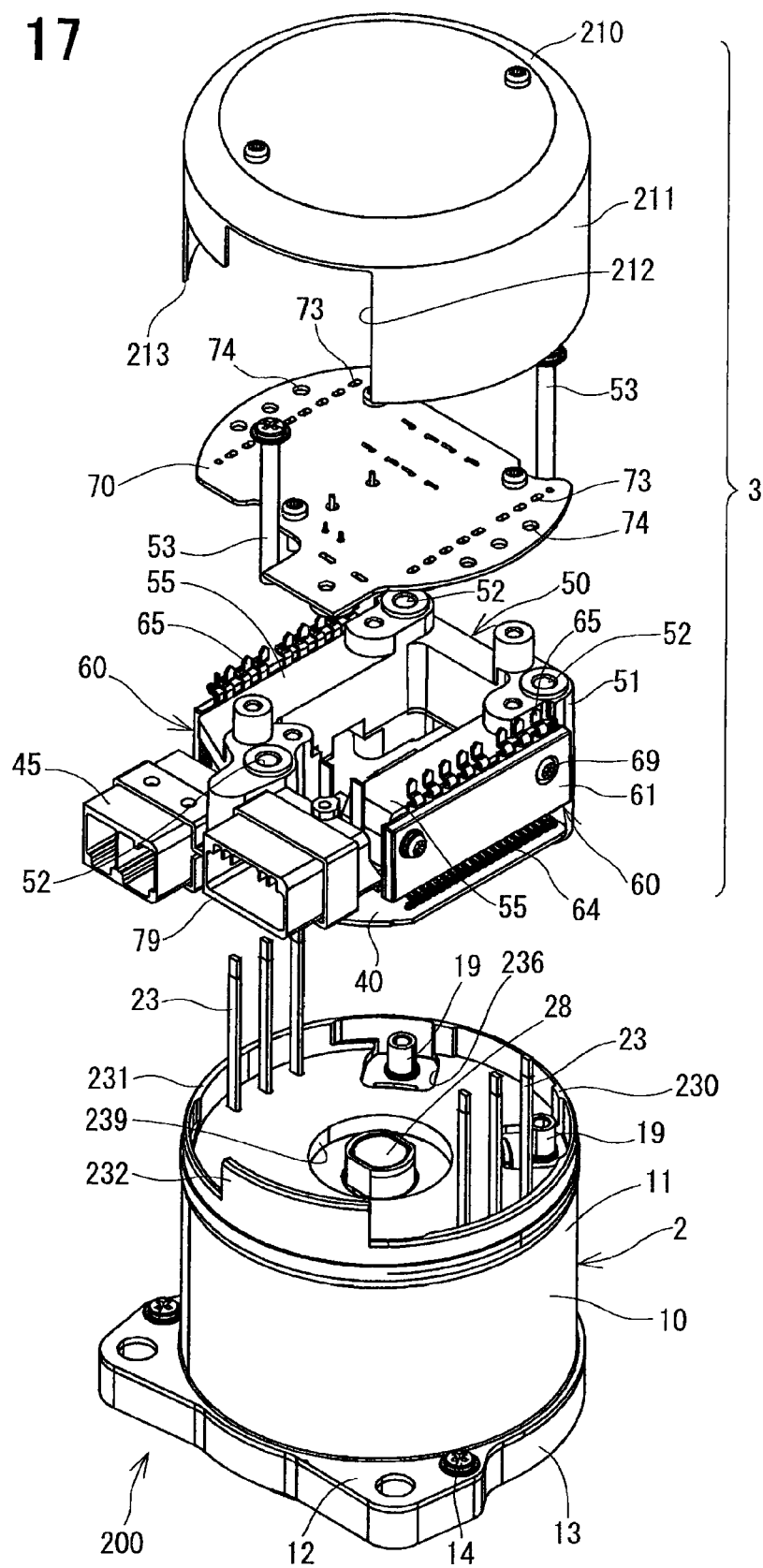
FIG. 17 is an exploded perspective view illustrating the drive device of the second embodiment.

A drive device 200 according to a second embodiment will be described with reference to FIGS. 15-17. The drive device 200 does not include the connector holder of the first embodiment. Further, the control connector 45 and the power connector 79 are located adjacent with each other on the same side, and are arranged to be connectable with external electronic component such as the power source 75 from outside in the radial direction.

An end cover 210 has a based cylinder shape open toward the motor 2, and has a diameter approximately the same as that of the motor case 10. A peripheral wall 211 of the cover 210 has a cutout 212 at a position corresponding to the control connector 45 and the power connector 79. The cutout 212 is shaped to correspond to the shapes of the control connector 45 and the power connector 79. The control connector 45 is located more close to the motor 2 than the power connector 79 in the axis direction, so that the cutout 212 has a step shape, as shown in FIG. 17. The control connector 45 and the power connector 79 are exposed from the cutout 212 in the radial direction, and are connected to external electronic components outside of the drive device 200 such as the power source 75.

A holder 230 is arranged between the motor 2 and the control unit 3. The holder 230 has an approximately disc shape having a diameter approximately the same as the motor case 10. The holder 230 is made of resin, for example.

The holder 230 has a wall part 231 extending toward the control unit 3, and the wall part 231 is formed around all the outer periphery of the holder 230. The wall part 231 has a first wall 321 and a second wall 322. The first wall 321 extends along the outer periphery. The second wall 322 is located between the first wall 321 and the control unit 3 in the axis direction, and is located on the inner side of the first wall 321 in the radial direction.

The second wall 322 is inserted to the inner side of the peripheral wall 211 of the end cover 210 in the radial direction, and the holder 230 and the end cover 210 fit with each other. A step is defined by a level difference between the first wall 321 and the second wall 322, and contacts an end 213 of the peripheral wall 211 of the end cover 210 opposing to the motor 2. Thus, invasion of foreign matter from outside to the drive device 200 in the radial direction is reduced.

The power connector 79 is located opposite from the motor 2 with respective to the control connector 45 in the axis direction. The wall part 231 of the holder 230 has a protrusion 232 protruding toward the control unit 3. The protrusion 232 has a shape corresponding to the level difference between the control connector 45 and the power connector 79 in the axis direction.

The holder 230 has a cutout 236 at a position corresponding to the column 19 and the leg 51 of the heat sink 50, so that the holder 230 does not interfere with the connection between the column 19 and the bolt 53. Moreover, a shaft hole 239 is defined in the center of the holder 230, and the end portion of the shaft 27 opposing to the control unit 3 passes through the shaft hole 239.

The wall part 231 of the holder 230 has the protrusion 232 protruding toward the control unit 3. Even if a clearance is defined between the power connector 79 of the control unit 3 and the holder 230, the protrusion 232 having the shape corresponding to the clearance restricts a foreign object from entering the control unit 3, similarly to the first embodiment.

Other Embodiment

The holder may be made of metal or other material other than resin. The holder may have a thread part that is tightened to the control unit, for example, in a manner that the thread part is directly engaged with an end portion of the peripheral wall of the cover opposing to the motor. In this case, a fastening component used for fastening the holder to the control unit is not necessary, so that the number of components can be reduced. At this time, the holder is made of metal in view of the strength. In the case where the holder is made of metal, an insulation member is additionally arranged between the taken-out wire and the holder to secure the insulation.

In the above embodiment, the holder has the fitting part protruding toward the motor, and the fitting part has the hole through which the taken-out wire passes. Alternatively, the face of the holder opposing to the motor may be flat without having a protrusion. The wall part of the holder may be arranged not all the circumference depending on the shape of the control unit.

The control unit may have only one board, that is, one of the control board and the power board. The winding wire and the power module may be directly connected with each other without the power board.

In the above embodiment, the power module has plural switching elements. Alternatively, the semiconductor module may be arranged for each of the switching elements. The location of the power module is not limited to the above description. The power module may be arranged to have right or other angle relative to the revolving shaft of the motor.

Such changes and modifications are to be understood as being within the scope of the present invention as defined by the appended claims.

What is claimed is:

1. A drive device comprising:
   a motor including
      a motor case having a cylindrical shape that defines an outer shape of the motor,
         a stator arranged in the motor case in a radial direction,
      a winding wire wound around the stator so as to define plural phases,
      a rotor arranged in the stator in the radial direction, the rotor being rotatable relative to the stator, and
      a shaft rotated with the rotor;
   a control unit including
      a semiconductor module having a switching element which switches electricity supply to the winding wire,
      a receiving member that receives the semiconductor module, and
      a cover which accommodates the semiconductor module and the receiving member in the radial direction, wherein the control unit is arranged on a side of the motor in an axis direction; and
   a holder arranged between the motor and the control unit, wherein the holder has a wall portion extending toward the control unit and fitting with the control unit,
   a guide part that holds a taken-out part of the winding wire taken out from the motor case to extend in a predetermined direction, and
   a hole part through which the taken-out part of the winding wire taken out from the motor case passes, and
   the guide part has a thickness that is larger than a thickness of a board-shaped part of the holder in the axis direction.

2. The drive device according to claim 1, wherein the wall portion of the holder extends around the entire circumference of the holder.

3. The drive device according to claim 1, wherein the holder is made of insulation material.

4. The drive device according to claim 1, wherein the holder is made of metal.

5. The drive device according to claim 1, wherein the holder has a fitting part protruding toward the motor case, and
the fitting part is fitted to an opening defined in a wall of the motor case opposing to the control unit.

6. The drive device according to claim 1, wherein the wall portion of the holder is fitted with the cover of the control unit by being inserted inside of the cover of the control unit in the radial direction.

7. The drive device according to claim 1, wherein the wall portion has a protrusion protruding toward the control unit.

8. The drive device according to claim 1, wherein the holder has a thread part that is tightened with the control unit.

9. The drive device according to claim 1, wherein the guide part projects toward the motor in the axis direction at a position corresponding to the hole part.

10. The drive device according to claim 9, wherein the guide part is defined around the entire circumference of the hole part.

11. The drive device according to claim 10, wherein an axial dimension of the hole part in the axis direction is equal to the sum of the thickness of the guide part and the thickness of the board-shaped part,
the guide part comprises a trapezoid-shaped board member parallel to the board-shaped part, and
the guide part has a concave portion on an inner side from the hole part in the radial direction, and the concave portion does not pass through the board-shaped part.

12. The drive device according to claim 1, wherein the wall portion of the holder projects toward the control unit and is fitted with the cover of the control unit at the entire circumference of the holder,
the guide part of the holder projects toward the motor case, and is fitted with an opening defined in a wall of the motor case at a position on an inner side from the wall portion in the radial direction, and
the wall portion and the guide part project in directions opposite from each other in the axis direction.

13. The drive device according to claim 1, wherein the guide part of the holder directly holds the taken-out part of the winding wire.

14. The drive device according to claim 1, wherein the holder is a single piece component which includes the wall portion, the guide part and the hole part.

15. The drive device according to claim 14, wherein the taken-out part of the winding extends directly through the hole part.

16. The drive device according to claim 1, wherein the hole part extends through the guide part.

17. The drive device according to claim 16, wherein a plurality of hole parts extend through a single guide part and each of a plurality of taken-out parts of the winding wire extend through a respective hole part.

18. The drive device according to claim 1, wherein the taken-out part of the winding wire is the only component disposed within the hole part.

* * * * *